Aug. 15, 1961  J. DOLZA  2,995,890
STARTING, ACCELERATING AND BRAKING MECHANISM
FOR AN INTERNAL COMBUSTION ENGINE
Filed May 31, 1957  3 Sheets-Sheet 1

INVENTOR.
John Dolza
BY
L. D. Burch
ATTORNEY.

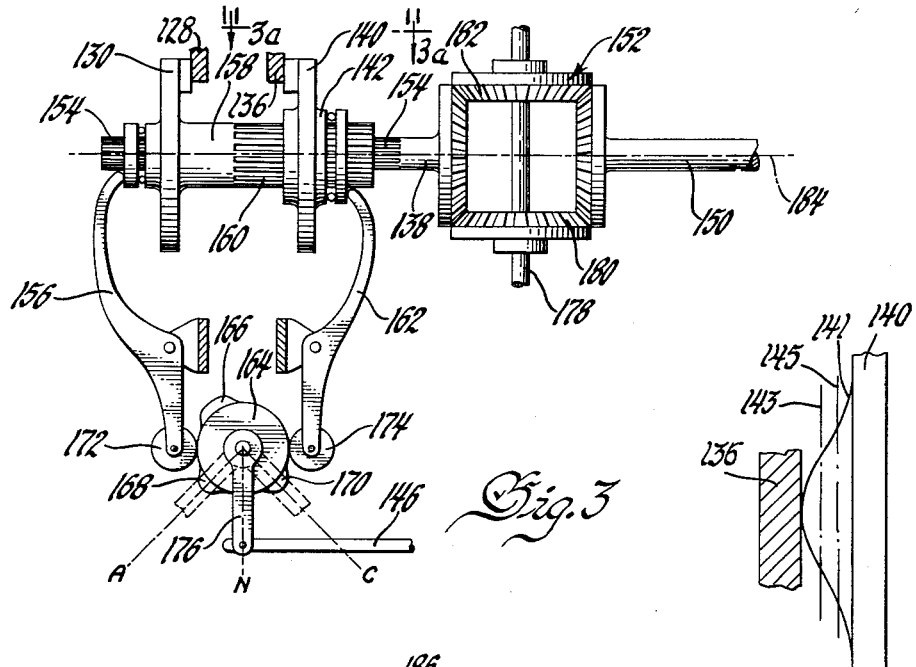
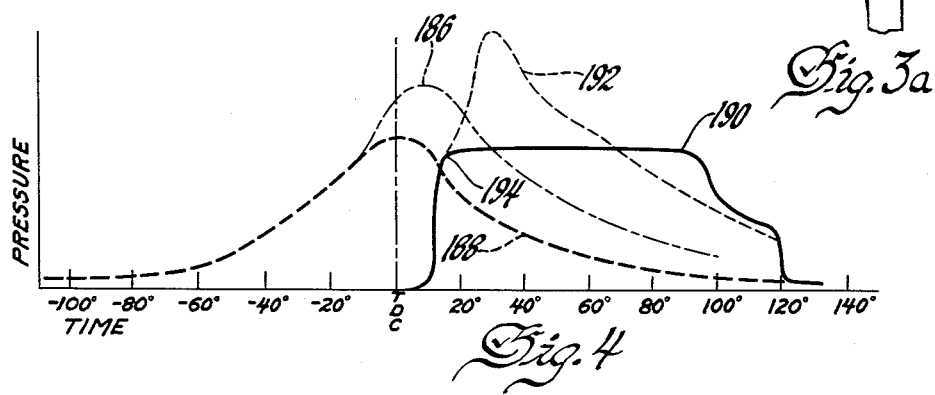
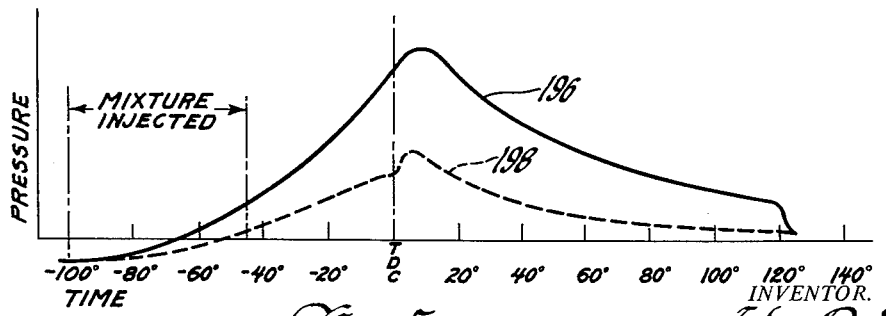

United States Patent Office 2,995,890
Patented Aug. 15, 1961

2,995,890
STARTING, ACCELERATING AND BRAKING MECHANISM FOR AN INTERNAL COMBUSTION ENGINE
John Dolza, Fenton, Mich., assignor to General Motors Corporation, Detroit, Mich., a corporation of Delaware
Filed May 31, 1957, Ser. No. 662,627
5 Claims. (Cl. 60—13)

The invention relates to an internal combustion engine and more particularly to a starting and accelerating mechanism therefor. It has long been known to utilize compressed air for starting and motoring an internal combustion engine by directing such compressed air into the cylinders during the expansion stroke. Previous proposals have included the introduction of combustion gases from an auxiliary combustion chamber into the engine cylinders in combination with a sufficient amount of charging air which may have originated at atmospheric pressure or have been precompressed.

It is now proposed to provide an improved mechanism for starting an internal combustion engine by the introduction of compressed air alone or in combination with vaporized unburned fuel into the cylinders of an internal combustion engine and burning the mixture so introduced in the cylinder in order to start the engine. The provision of auxiliary combustion chambers is thereby eliminated and full advantage may be taken of the heat realized during combustion to warm up the engine cylinders more quickly. This starting process can be executed during the expansion stroke, such as for instance from 10° after top dead center until 100° after top dead center on a four-cycle engine. The duration of the introduction period may be varied and woud be somewhat different for a two-cycle engine.

It is also proposed to use either compressed air alone or compressed air with a charge of vaporized fuel carried therein during acceleration periods in order to provide additional power during such periods. When internal combustion engines are provided with an exhaust driven supercharger, the proposed mechanism can be timed so as to increase the power delivered to the driving turbine during periods in which the engine is turning at slow speeds such as when it is being started and during acceleration periods when the engine is under a heavy load. When the engine is coasting or decelerating, the mechanism can be timed so as to provide braking by pumping action of the engine. The desired operations of the mechanism may be controlled by the operator through manually controlled mechanism which may include the throttle control linkage. A simplified mechanism is provided which will automatically permit introduction of compressed air either with or without vaporized fuel when the engine is being started or accelerated and will not permit loss of engine compression.

Figure 1:
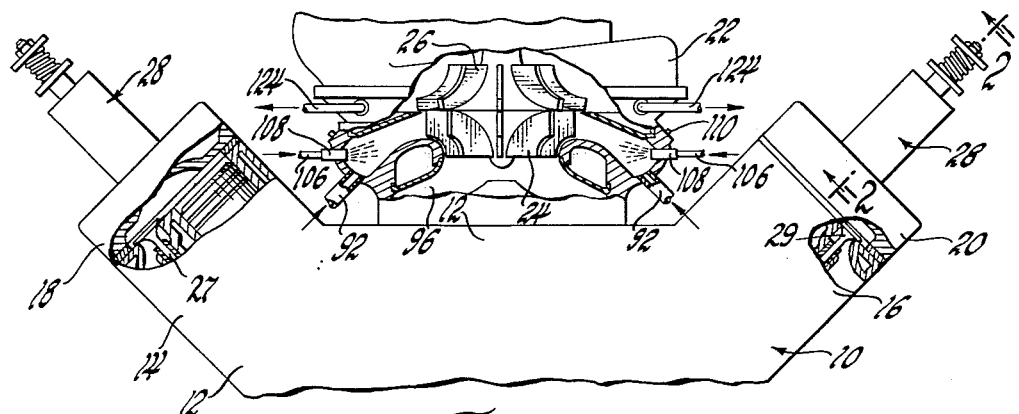
Figure 2:
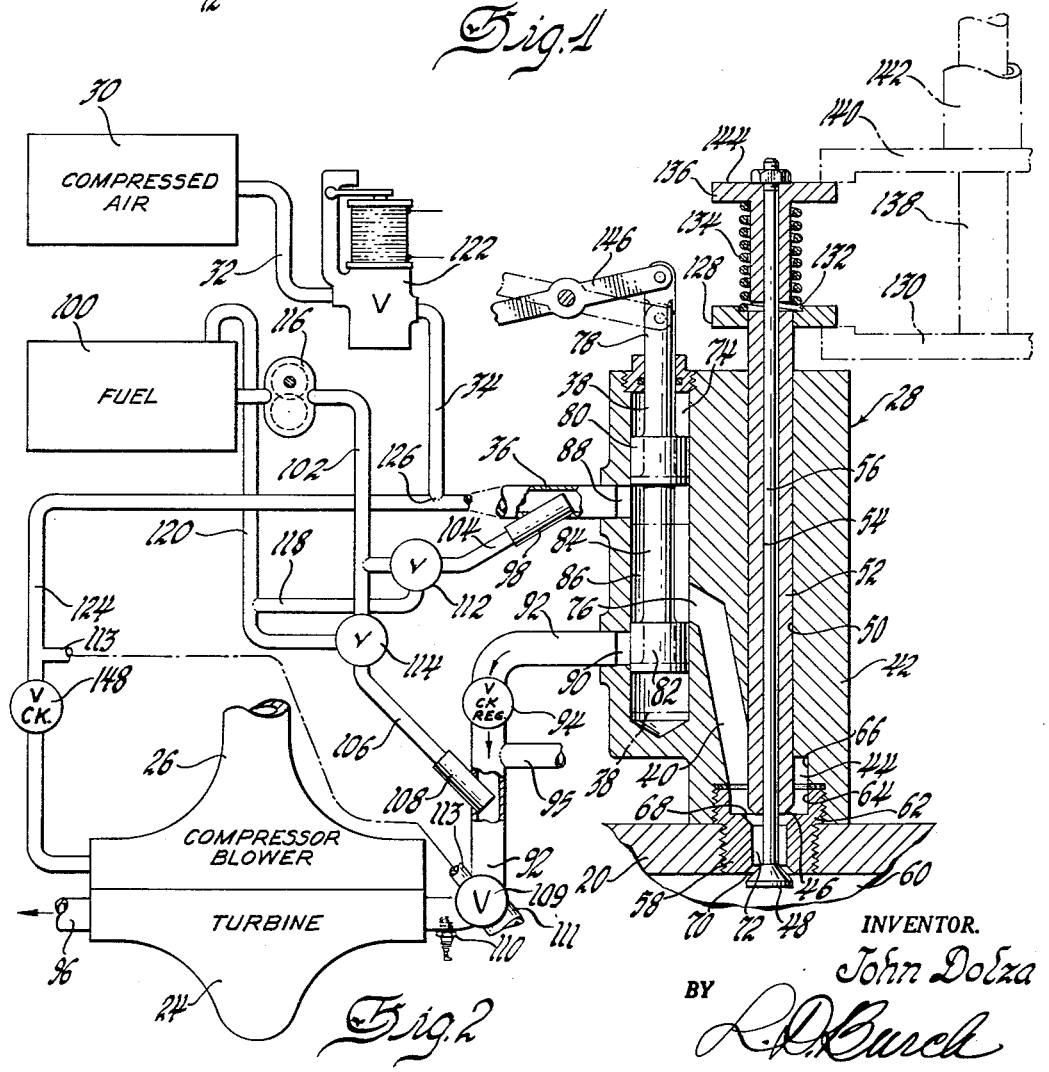

In the drawing:
FIGURE 1 is a partial end view of an internal combustion engine embodying the invention with parts broken away and in section.
FIGURE 2 is a schematic diagram of the mechanism embodying the invention with parts broken away and in section.
FIGURE 3 illustrates an example of a cam actuating mechanism which may be used to control the mechanism.
FIGURE 3a is a view of a portion of the mechanism of FIGURE 3 taken in the direction of arrows 3—3 on that figure, with parts broken away.
FIGURES 4 through 9, inclusive, show pressure diagrams illustrating the results of the three functions of the mechanism upon the operation of internal combustion engines.

The internal combustion engine 10 is illustrated as a V-type engine, although it may be of any other type, and includes an engine block 12 having banks of cylinders 14 and 16. The engine may be either a two-cycle or four-cycle type. The cylinder banks are provided with cylinder heads 18 and 20 respectively. An exhaust driven supercharger 22 may be mounted on the engine and includes an exhaust driven turbine 24 and a compressor blower 26 which is driven directly by the turbine. In addition to conventional intake and exhaust valves 27 and 29, respectively, each engine cylinder is preferably provided with a valve mechanism 28 which permits access to and from each cylinder. A compressed air reservoir 30 is connected with valve mechanisms 28 through lines 32 and 34, manifold 36 and control valve 38. Valve 38 is connected through a passage 40 in the valve mechanism body 42 to a valve chamber 44. Each valve mechanism 28 includes an outer valve 46 and an inner valve 48. Valve body 42 is provided with a cylindrical bore 50 in which the stem 52 of outer valve 46 is reciprocably mounted. Valve stem 52 has an axial bore 54 through which stem 56 of an inner valve 48 extends and in which it may be reciprocated. Cylinder heads 18 and 20 have valve seat inserts 58 suitably secured therein and extending through the heads to the respective combustion cylinders 60. Each valve seat insert 58 is provided with an annular extension 62 to which each valve body 42 is attached by any suitable means such as screw threads. The bore 64 of each valve seat insert 58 forms valve chamber 44 in cooperation with recess 66 within valve body 42. Valve seat insert 58 is provided with a conical seat 68 adjacent bore 64 and with a conical seat 70 in its end extending to combustion chamber 60. A passage 72 formed in insert 58 connects valve chamber 44 with combustion chamber 60 and is concentric with and located between valve seats 68 and 70.

Valve body 42 may be provided with a valve bore 74 in which control valve 38 is positioned for reciprocable movement. Passage 40 extends from valve chamber 44 to bore 74 and terminates within that bore at opening 76. Control valve 38 may be of the spool type and includes reduced end 78 and lands 80 and 82 which fit closely within bore 74. These lands are connected by a reduced section 84, thereby forming a chamber 86 to which opening 76 provides access when the control valve is in either of its two positions. Manifold 36 terminates at access opening 88. The first position of control valve 38 is illustrated in FIGURE 2 by solid lines and the second position is illustrated by phantom lines. When the control valve is in the first position, access opening 88 is connected with opening 76 through chamber 86. When the valve is in the second position, land 80 covers opening 88.

A passage 90 is also provided in the wall of bore 74 and is so positioned relative to opening 76 and the spacing of valve lands 80 and 82 that it may be either closed by land 82 or connected with chamber 86. Fuel tank 100 may have a fuel line 102 leading therefrom and connecting through line 104 to fuel nozzle 98. A turbine fuel line 106 is connected with line 102 and leads to fuel nozzle 108. This nozzle is preferably located between valve 94 and turbine 24 in conduit 92. The main exhaust line 95 from the engine exhaust manifold may be connected into conduit 92 intermediate valve 94 and nozzle 108. A fuel ignition device 110, which may be of any suitable type such as a spark ignition plug or a glow plug, may be provided in conduit 92 adjacent turbine 24. An exhaust turbine by-pass valve 109 is provided in conduit 92 so that engine exhaust gases may be passed around the turbine 24 to atmosphere through conduit 111 when it is desirable not to operate compressor 26. Valve 109 may be sensitive to compressor output pressure by connecting the compressor blower outlet line to the valve by conduit 113. If desired, conduit 113 may be directly connected to the air reservoir 30 to directly sense that pressure for operation of by-pass valve 109. A starting and accelerating engine fuel supply control valve 112 is provided in line 104 to control the supply of fuel to nozzle 98. A starting and accelerating turbine fuel supply control valve 114 is preferably provided in line 106 to control the supply of fuel to the nozzle 108. Lines 102, 104, and 106 are charged with fuel under pressure by pump 116. This pump may be of any suitable type. If it is of the positive displacement type, fuel return lines 118 and 120 may be provided to return undelivered fuel to fuel tank 100 when either valve 112 or valve 114 is closed. These valves may each incorporate a pressure regulating valve to maintain fuel pressure in the fuel lines between pump 116 and the valves.

Air line 32 leading from reservoir 30 is connected with a solenoid control valve 122. Air line 34 is also connected with valve 122. The compressor blower 26 is provided with an outlet line 124 which connects with line 34 at intersection 126.

A pair of control cams are provided to control inner valve 48 and outer valve 46. The external end of valve stem 52 is provided with a bushing 128 rigidly secured thereto with which starting and accelerating cam 130 is engaged. Bushing 128 may have a recessed spring seat 132 in which compression spring 134 is received. Valve stem 56 has attached adjacent its outer end and beyond bushing 128 a bushing 136 which forms a seat for the other end of spring 134. Spring 134, therefore, tends to keep bushings 128 and 136 apart. When one of the valves seats against its seat, the other valve is then biased toward its seat also. Cam 130 is attached to rotate with cam shaft 138. Coasting cam 140 is attached for rotation with cam shaft 142 and is engageable with the outer end 144 of bushing 136. Cams 130 and 140 may be reciprocated axially as desired to permit controlling engagement with the bushings of valves 46 and 48. While the cams are shown as being mounted on separate cam shafts, they may be mounted on a common cam shaft if desired.

The discussion below relates to the timing of a four-cycle engine. It is obvious that the duration of timing may be modified for a two-cycle engine in order to complement rather than interfere with the various portions of the cycle.

Cam 130 actuates the outer valve 46 in such a manner that this valve is opened as follows during the periods noted: From approximately 10° after top dead center to 100° after top dead center when in starting position; advanced to open in a portion or all of the time range from 100° before top dead center to 10° before top dead center when in the acceleration position for low speeds and heavy loads; and in a portion or all of the time range from approximately 45° before top dead center to 45° after top dead center when in the coasting or braking position. Such positioning can be achieved by utilizing a differential drive with a positioning mechanism which rotates cam 130 as desired from a full retarded position for starting to a fully advanced position for accelerating through a mid position for coast-braking. When so desired, cam 130 may be disengaged from bushing 128 so that the cam is not in a valve operating position and the valve remains closed when the system is not to be used.

The throttle control linkage 146 for the internal combustion engine is connected to the outer end 78 of control valve 38 and is also connected to move coasting cam 140 into contact with bushing end 144 when the engine is at zero throttle.

The operation of the system will now be described:

When the engine is at rest and compressed air reservoir 30 is filled to the required pressure, the engine may be started by use of the system. Starting cam 130 is in engagement with the surface of bushing 128 as described above for the coasting-braking position. Coasting cam 140 is indirectly mounted on the drive shaft 138 through splined hub 158 so that it can in effect slide axially upon that shaft and can be moved into such a position that physical contact of the cam 140 with bushing 144 forces the opening of the inner valve 48 from, for example, 20° before top dead center until 20° after top dead center. The length of engagement of cam 140 with bushing 144, and thus the opening of valve 48, can be made variable by moving cam 140 toward or away from the plane of bushing 144 which is engageable by the cam. This is illustrated in FIGURE 3a. Control valve 38 is in the position shown in solid lines in FIGURE 2. Solenoid valve 122 is energized, admitting compressed air through lines 32 and 34 to manifold 36. Check valve 148 in line 124 prevents the compressed air from flowing back into the compressor-blower. The air enters valve body 28 through access opening 88 and passes through chamber 86 to opening 76. It flows through passage 40 to valve chamber 44 and through the opening intermittently formed by valve 46 in timed relation with the engine piston. The air is at a sufficient pressure to open valve 48 against the force of spring 134. Valve 46 is provided to obtain the desired timing and valve 48 is provided to insure introduction of air into chamber 60 only if the air is at a pressure greater than the pressure of the gases already in the chamber. The air flows into the combustion chamber 60 and acts on the engine piston within the chamber to start and motor the engine.

As the engine begins to rotate, fuel pump 116 supplies fluid under pressure from fuel tank 100 to fuel line 102. Valves 112 and 114 are normally in the closed position. When the fuel pressure is sufficient to cause atomization of the fuel at the fuel nozzles 98 and 108, valve 112 may be opened, discharging fuel through fuel nozzle 98 into the compressed air stream passing through manifold 36. The mixture of compressed air and unburned fuel is transmitted to the engine cylinder 60 as was the air earlier described.

An ignition device is preferably provided in the engine cylinder; however, if the engine is of the compression ignition type, the fuel may be ignited by the heat of compression. The energy of the burning fuel is then added to the energy of the compressed air in motoring the engine over and bringing it to a self-sustaining speed. When the compression pressure in cylinder 60 is sufficient to overcome the pressure of the compressed air passing through passage 72 less the force of spring 134, valve 48 is closed by check valve action. The cylinder 60 thus suffers no loss in compression. The gases generated and received within cylinder 60 are exhausted through the main exhaust line 95 to exhaust conduit 92, by which they are carried to supercharger turbine 24 to drive that turbine. The gases exhausting from turbine 24 are passed to the atmosphere through exhaust line 96. In order to provide a continuous supply of compressed air even at the low engine speeds which are often encountered during starting and under heavy loads, a fuel nozzle 108 may be provided in exhaust conduit 92 at a point adjacent turbine 24. Turbine fuel line 106 connects nozzle 108 with fuel line 102 through turbine fuel control valve 114. If it is desired by the operator to replenish the compressed air supply quickly or to add to the supply during starting, acceleration or other periods, valve 114 may be opened to admit fuel to nozzle 108. This fuel is injected as an atomized spray into the exhaust gases passing into turbine 24. A fuel ignition device 110 positioned adjacent the turbine inlet may be energized to ignite the fuel as it passes into the turbine. Fuel burned at this point provides additional energy to turn the turbine at higher speeds and with a greater power than otherwise possible during starting or accelerating conditions. The additional power is transferred to the compressor blower 26 which delivers air at higher pressure or a greater volume, or both, to manifold 36. Should the compressed air reservoir 30 be at a pressure less than the output pressure of compressor 26, the compressor will also recharge the reservoir. The operation of the system may be discontinued by closing valves 122, 112 and 114. Also, when reservoir 30 is fully charged, by-pass valve 109 is actuated to by-pass engine exhaust gases around turbine 24 to prevent overloading the engine.

The system may also be used to deliver additional power during short acceleration periods. When the engine throttle mechanism is in the full throttle or beyond full throttle condition, valve 122 is opened. Valve 38 is positioned as for starting and compressed air is delivered to the engine cylinders during the period in which the compressed air is at a greater pressure than the gases within the cylinder 60 during the time at which valve 46 is opened. The auxiliary fuel supply system for delivery fuel through nozzle 98 may also be operated under accelerating conditions if desired to obtain increased power.

The system may be modified to provide a coasting brake during periods of zero throttle operation. This is accomplished by moving coasting cam 140 axially into engagement with the end 144 of bushing 136. The cam may be constructed to open valve 48 from a point 20° before top dead center to a point 20° after top dead center. This opening period may be varied by cam design. When the throttle linkage is at zero throttle, control valve 38 is shifted to its second position as shown by phantom lines in FIGURE 2. The gases within cylinder 60 pass through passages 72 and 40 into valve chamber 86, out of valve body 42 through passage 90 and into exhaust conduit 92. These gases are at the maximum pressure obtained within the chamber 60 during deceleration. The energy retained within the compressed gases is thus utilized to drive turbine 24 and maintain compressed air reservoir 30 at full pressure. The absorption of this energy acts as a brake on the engine.

FIGURE 3 shows diagrammatically a cam actuating mechanism which may be used to control the system. Cam shaft 150 is engine driven and drives cam shaft 138 through the differential gear assembly 152. Cam shaft 138 has an external spline 154 on which is mounted cam 130. This cam may slide axially on the spline 154 under the control of lever 156. Hub 158 of cam 130 is provided with an external spline 160 on which cam 140 is internally splined through hub 142. A lever 162 is provided to control cam 140.

The actuation of levers 156 and 162 can be performed by a properly profiled cam wheel 164. This wheel is preferably provided with a cam 166 for the coasting-braking position, cam 168 for the full throttle acceleration position as well as the starting position, and cam 170 which actuates lever 162 for the coasting-braking operation. Cam 170 may be profiled so that a more extended engagement is acquired when more braking is required to follow a more complete release of the throttle. Cams 166, 168, and 170 may be arranged to engage cam followers 172 and 174 to actuate levers 156 and 162. The cam wheel 164 may be provided with a lever 176 which is connected to be positioned by throttle linkage 146.

To achieve proper timing of the cams, shaft 178, carrying the planetary gears 180 and 182, can be positioned either manually or mechanically into three positions by rotating shaft 178 in a plane perpendicular to the plane of FIGURE 3 and around the centerline 184 of the cam shaft 150. These three positions correspond to a retarded position for starting, an advanced position for acceleration, and the mid position for coasting.

FIGURE 3a shows the engagement of cam 140 with bushing 136. Since cam 130 similarly engages bushing 128 only one of these combinations is shown and will be described. It should be understood that the other cam and bushing combination operates in a similar manner. Cam 140 may have a curved portion 141 which extends generally parallel to the axis of shaft 138 and toward bushing 136 so that it may engage that bushing upon actuation of lever 162. The duration of the engagement of cam curved portion 141 with the bushing 136 is determined by the amount of axial movement imparted to cam 140 or spline 160 by counterclockwise rotation of lever 162. In the position shown in FIGURE 3a, the curved portion 141 does not engage bushing 136 so as to move that bushing under influence of the cam. If cam 140 is moved to the left, bushing 136 may, for example, engage a curved section of portion 141 at the points where section line 143 intersects curved portion 141. This will provide a certain duration of valve opening for valve 48. If cam 140 is moved further to the left, bushing 136 may engage cam curved portion 141 at the points of intersection of section line 145 with the cam surface of portion 141. This will provide a greater duration of the valve opening time for valve 48. Cam curved portion 141 is diagrammatically illustrated to provide a valve opening and closing action. The cam design may of course be varied to obtain different valve actuations other than that obtained by the particular curve illustrated. For example, the curved portion 141 may have a greater or a lesser valve lifting and closing rate and may provide a flat section to furnish a valve maximum opening dwell period.

The overall mechanical operation of the mechanism for actuating valves 46 and 48 will now be described. Shaft 150 is rotated in timed relation to the engine 12, driving shaft 138 through the differential gear mechanism 152. The phase relation of shafts 150 and 138 is varied by the planetary gears 180 and 182 as described above to obtain the desired timing. The rotation of shaft 138 is transmitted to cam 130 through splines 154 and to cam 140 through splines 160. Cams 130 and 140 selectively actuate the bushings 128 and 136 in accordance with the setting obtained by movement of levers 156 and 162. The movement of bushings 128 and 136 obtained from cams 130 and 140 is transmitted to their respective valves 46 and 48.

FIGURE 4 shows the pressure-time diagram for an internal combustion engine starting with compressed air alone or with a compressed air and fuel mixture which is ignited by a retarded spark. The background curve 186 represents compression and subsequent combustion of the mixture and further expansion during the work stroke. Background curve 188 represents compression and expansion only. Curve 190 indicates starting by admission of compressed air to the cylinder, and curve 192 indicates starting by admission of a compressed fuel and air mixture to the cylinder and igniting that mixture by means of a spark at point 194.

FIGURE 5 shows a pressure-time diagram illustrating the acceleration of a spark ignition gasoline engine with a compressed air and fuel mixture injected to obtain additional acceleration. The curve 196 illustrates the condition during acceleration and curve 198 illustrates the throttled and idling condition of the engine. During acceleration the air and fuel mixture is injected from approximately 100° before top dead center to 45° before top dead center. To accomplish fast acceleration of a gasoline engine which is operating on the idle curve 198, the engine may be immediately brought to full load. By injecting the compressed mixture during the first part of the compression stroke, the resulting curve 196 is obtained. A similar result can be obtained for a compression-ignition type internal combustion engine.

Figure 6:
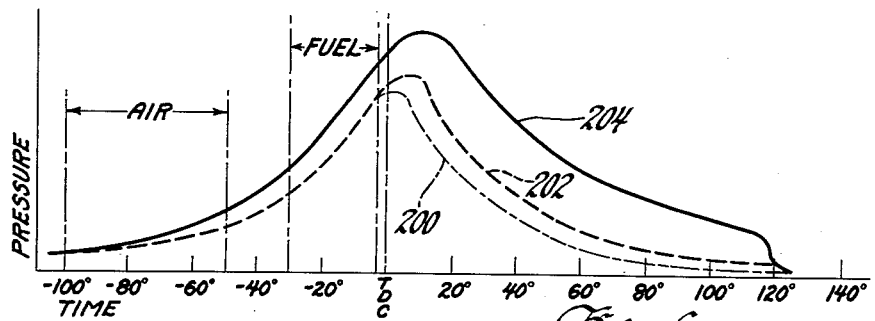

FIGURE 6 illustrates the pressure-time diagram obtained when accelerating a compression-ignition type internal combustion engine. Compressed air is introduced over a range extending approximately from 100° before top dead center to 45° before top dead center and fuel is introduced from approximately 30° before top dead center to approximately 5° before top dead center. The possibility of increasing the normal air intake by injecting additional compressed air in the begining of the compression stroke and additional fuel slightly later in the compression stroke in order to bring the idling engine to an overload operation condition is shown by curve 204. This curve is superimposed on the conventional compression curve 200 and the idling curve 202.

Figure 7:
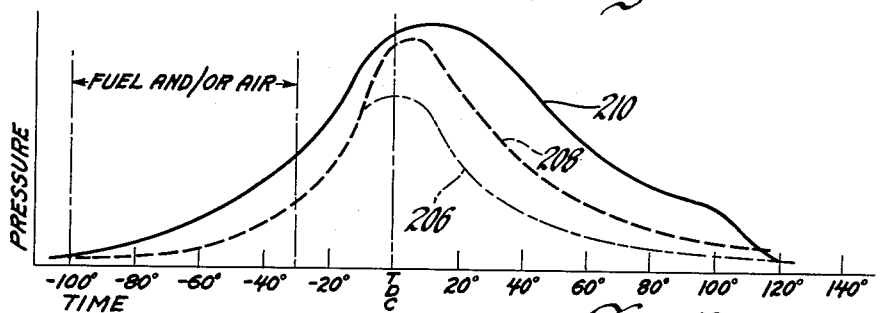

FIGURE 7 is a pressure-time diagram showing the increase obtained in an internal combustion engine by injecting additional compressed air or compressed air and fuel at low speeds and under heavy load conditions. The fuel or air, or fuel and air mixture, may be introduced from approximately 100° before top dead center to 30° before top dead center. Operational curve 210 illustrates torque increase obtained by injecting additional compressed air with or without additional fuel for combustion. The curve is compared with the normal full load condition curve 208 superimposed on the compression curve 206.

Figure 8:
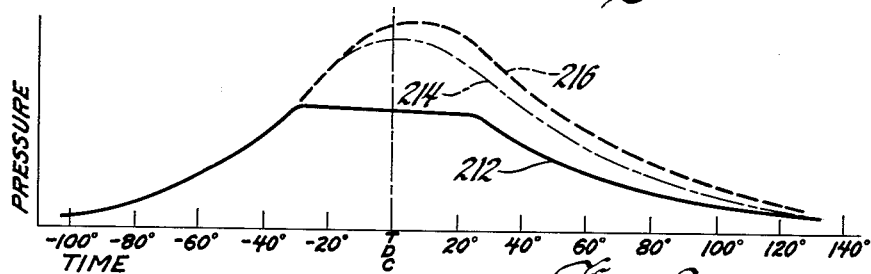

FIGURE 8 shows the pressure-time diagram under coasting-braking conditions with a compression-ignition type internal combustion engine. Curve 216 is the idling condition superimposed on the compression curve 214. By pumping part of the compressed air out of the engine, as well as some of the products of combustion, operation along curve 212 can be realized. This results in engine braking work corresponding to the work represented by the difference between curves 216 and 212. This work is to be supplied by the kinetic energy of the vehicle. This, in turn, results in a reduction of vehicle speed.

Figure 9:
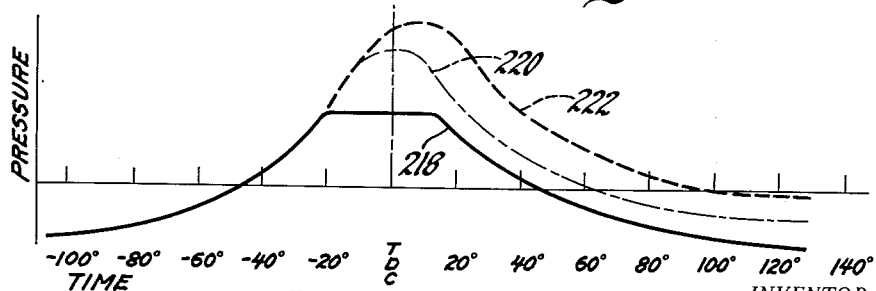

FIGURE 9 shows the pressure-time diagram under coasting-braking conditions of a spark ignited gasoline engine. Curve 218 indicates braking compression of a mixture of fuel and air normally following curve 222 or, in case fuel is cut off from the compression of the air alone, following curve 220. The compressed product is removed to a compressed gas tank. The motion of the vehicle supplies this work of compression and the vehicle speed is therefore reduced.

An internal combustion engine starting, accelerating, and coasting mechanism has thus been provided which permits immediate engine starting with a minimum amount of intake air starvation and a maximum utilization of available energy to start the engine during this period. The system may also be effectively utilized to provide additional acceleration power as required. It may further be used to provide a coasting brake which uses the energy absorbed under decelerating conditions to charge the starting and accelerating air reservoir.

What is claimed is:

1. A starting, accelerating and coasting auxiliary mechanism for an internal combustion engine having a normal fuel and air supply, said auxiliary mechanism including an auxiliary compressed air and fuel mixture supply, means for introducing said auxiliary mixture into the combustion chamber of the engine during starting and accelerating periods, said mixture being introduced in timed relation to the pistons of said engine, means for augmenting and replenishing the supply of compressed air, said means being driven by the engine exhaust gases, auxiliary fuel means for increasing the power available to drive said replenishing means, and control means for directing engine exhaust gases under maximum compression pressure obtained in the engine combustion chambers to said replenishing means during zero throttle decelerating periods to remove the compression energy therefrom and store that energy in said compressed air supply.

2. Braking means for an internal combustion engine, said means being operative under deceleration conditions and including valve mechanism interconnected with a cylinder of said engine and independent of the normal engine intake and exhaust valves, timing control means for said valve mechanism, throttle sensitive control valve means in series with said valve mechanism, said valve mechanism being responsive to said timing control means to permit exhaust gases to pass from said cylinder under compression pressure and through said control valve means in timed relation to said engine and through an air compressor motor, and accumulator means connected with said valve control means and said motor for receiving and storing energy contained in said exhaust gases for later use.

3. Auxiliary means for increasing power available from a piston and cylinder type internal combustion engine during acceleration periods and storing exhaust energy from said engine during deceleration periods, said auxiliary means comprising a fuel source, a compressed air source including an engine exhaust gas driven turbine and compressor unit and a reservoir, a control mechanism for admitting compressed air and fuel from said sources into the cylinders of said engine in timed relation therewith whereby said engine is accelerated by energy in said air and said fuel, said control mechanism admitting engine exhaust gases to said exhaust gas driven turbine and compressor unit during deceleration to provide power for compressing air and to store the energy contained in the exhaust gases during deceleration so that said reservoir is maintained in a charged condition, and fuel supply means for directing fuel into said engine exhaust gases whereby power to said compressor is increased.

4. In an internal combustion engine starting and accelerating and braking system for an engine having a fuel and air supply independent of said system, a source of compressed air, a source of fuel under pressure, means for introducing fuel and air from said sources into said engine and including a first valve and a second valve in series with said first valve, said valves controlling the introduction of the fuel and air supply from said sources into said engine, cams for controlling said valves in timed relation with said engine, and means for varying the timing of said cams to provide starting timing and acceleration timing and braking timing, said last named means including a variable camshaft.

5. For use in starting and accelerating and braking an internal combustion engine having a fuel and air supply system for normal operation of the engine and a throttle control mechanism for normal engine control, auxiliary mechanism operative independently of the normal engine fuel and air supply system and comprising, a reservoir of pressurized air and a source of fuel, valve means and conduit means associated therewith for introducing fuel and pressurized air into the combustion chamber of the engine from said reservoir and said fuel source during starting and accelerating periods in timed relation to the engine whereby the engine starting power is obtained from the pressure of the air and the burning of the fuel introduced, engine exhaust gas driven means for augmenting and replenishing said reservoir with pressurized air, control linkage interconnecting the engine throttle control mechanism and said valve means and conditioning said valve means for operation, and valve actuating mechanism connected with said valve means to vary the timing of said valve means for starting and accelerating conditions, said control linkage being positionable by the engine throttle control mechanism at zero throttle to control said valve means to direct engine exhaust gases under maximum compression pressure through said valve means to said exhaust gas driven means to provide engine braking and to store the braking pressure energy contained in said compressed exhaust gases in said reservoir for use during later starting and accelerating periods.

References Cited in the file of this patent

UNITED STATES PATENTS

| | | |
|---|---|---|
| 929,540 | Berliet | July 27, 1909 |
| 1,132,393 | Schmucker | Mar. 16, 1915 |
| 1,398,944 | Pieper | Nov. 29, 1921 |
| 1,624,525 | Beach | Apr. 12, 1927 |
| 2,010,469 | Triebnigg | Aug. 6, 1935 |
| 2,379,455 | Prince | July 3, 1945 |
| 2,410,660 | Howard | Nov. 5, 1946 |
| 2,412,457 | Harrison | Dec. 10, 1946 |
| 2,561,598 | Schowalter | July 24, 1951 |
| 2,595,281 | Miller | May 6, 1952 |
| 2,608,051 | Nettel | Aug. 26, 1952 |
| 2,654,991 | Nettel | Oct. 13, 1953 |
| 2,664,957 | Catford et al. | Jan. 5, 1954 |
| 2,799,255 | Gehres | July 16, 1957 |
| 2,921,431 | Sampietro | Jan. 19, 1960 |